United States Patent
Tracht

(10) Patent No.: US 10,784,908 B2
(45) Date of Patent: Sep. 22, 2020

(54) SPUR REDUCTION CIRCUIT AND APPARATUS, RADIO TRANSCEIVER, MOBILE TERMINAL, METHOD AND COMPUTER PROGRAM FOR SPUR REDUCTION

(71) Applicant: INTEL IP CORPORATION, Santa Clara, CA (US)

(72) Inventor: Thorsten Tracht, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/484,836

(22) PCT Filed: Mar. 10, 2017

(86) PCT No.: PCT/IB2017/051417
§ 371 (c)(1),
(2) Date: Aug. 9, 2019

(87) PCT Pub. No.: WO2018/162958
PCT Pub. Date: Sep. 13, 2018

(65) Prior Publication Data
US 2019/0386693 A1 Dec. 19, 2019

(51) Int. Cl.
*H04B 1/10* (2006.01)
*H04B 1/04* (2006.01)
*H04L 25/08* (2006.01)

(52) U.S. Cl.
CPC .......... *H04B 1/1036* (2013.01); *H04B 1/0475* (2013.01); *H04L 25/08* (2013.01)

(58) Field of Classification Search
CPC ...... H04B 1/10; H04B 1/1018; H04B 1/1027; H04B 1/1036; H04B 1/0475; H04L 25/08
See application file for complete search history.

(56) References Cited

U.S. PATENT DOCUMENTS 5,758,275 A * 5/1998 Cox ..................... H04B 1/1036
455/306
7,142,888 B2 11/2006 Okawa et al.
(Continued)

FOREIGN PATENT DOCUMENTS

WO 2013123076 A1 8/2013
WO 2016207759 A1 12/2016

OTHER PUBLICATIONS

"Adaptive Filter: Eine Einführung in die Theorie", G. Moschytz-M. Hofbauer, Springer Verlag.

*Primary Examiner* — Siu M Lee
(74) *Attorney, Agent, or Firm* — 2SPL Patent Attorneys

(57) ABSTRACT

Examples provide a spur reduction circuit and a spur reduction apparatus, a radio transceiver, a mobile terminal, a method and a computer program for spur reduction. The spur reduction circuit (10) is configured to reduce spur interference in a baseband radio signal, d(n), n indexing samples and comprises at least one input (12) for the baseband radio signal, d(n), and information on at least one spur frequency, ω(n). The spur reduction circuit further comprises an adaptive filter (14) configured to filter the baseband radio signal, d(n), to obtain a baseband radio signal with reduced spur interference, e(n). The adaptive filter (14) is further configured to filter the baseband radio signal, d(n), based on at least one filter coefficient, w(n), and based on the information on the at least one spur frequency, ω(n). The spur reduction circuit (10) further comprises an update module (16) configured to adapt the at least one filter coefficient, w(n), based on the baseband radio signal with reduced spur interference e(n). The spur reduction circuit (10) further comprises at least one output (18) for the baseband signal with reduced spur interference e(n).

24 Claims, 8 Drawing Sheets

(56) References Cited

U.S. PATENT DOCUMENTS

| | | | | |
|---|---|---|---|---|
| 8,145,165 B1* | 3/2012 | Su | .................. | H03G 3/3052 |
| | | | | 455/232.1 |
| 8,149,896 B2 | 4/2012 | Filipovic | | |
| 8,396,427 B2* | 3/2013 | Le Guillou | .......... | H04B 1/1036 |
| | | | | 455/136 |
| 9,112,748 B2* | 8/2015 | Asuri | .................. | H04L 25/08 |
| 2008/0089440 A1* | 4/2008 | Curtis | .................. | H03D 7/00 |
| | | | | 375/296 |
| 2009/0086864 A1* | 4/2009 | Komninakis | ............ | H04B 1/10 |
| | | | | 375/346 |
| 2011/0007839 A1* | 1/2011 | Tang | .................. | H03F 1/32 |
| | | | | 375/296 |
| 2012/0105284 A1* | 5/2012 | Anandakumar | ...... | G01S 19/246 |
| | | | | 342/357.59 |
| 2012/0322395 A1* | 12/2012 | McCullagh | .......... | H04B 1/1036 |
| | | | | 455/114.2 |
| 2015/0124914 A1* | 5/2015 | Arslan | .................. | H04B 15/04 |
| | | | | 375/346 |
| 2018/0159585 A1* | 6/2018 | Kanumalli | ............. | H04B 1/525 |

\* cited by examiner

SPUR REDUCTION CIRCUIT AND APPARATUS, RADIO TRANSCEIVER, MOBILE TERMINAL, METHOD AND COMPUTER PROGRAM FOR SPUR REDUCTION

FIELD

Examples relate to a spur reduction circuit and a spur reduction apparatus, a radio transceiver, a mobile terminal, a method and a computer program for spur reduction, and in particular, but not exclusively, to a concept and mechanism for reducing spur in a radio signal in an efficient implementation.

BACKGROUND

With the growing demand for wireless services, Radio Frequency (RF) circuits become more and more versatile. For example, the number of wireless access technologies and the frequency range in which mobile communication systems are active are growing, wherein a physical size and power consumption of RF units is decreasing. For example, $5^{th}$ Generation (5G) system may operate using mm-wave technology, e.g. the U.S. Federal Communications Commission (FCC) approved spectrum for 5G, including the 28, 37, and 39 GHz bands.

RF circuit components such as filters, amplifiers, antennas, diplexers, duplexers, etc. are designed for such high frequency and broad bandwidth applications. Spurs are narrowband interference signal that occur in RF frontend components, e.g. due to imperfect crosstalk between transmitter and receiver branches, etc. Today's user equipment support various communication standards like GSM (Global System for Mobile communication), WCDMA (Wideband Code Division Multiple Access), LTE (Long Term Evolution), WIFI (Wireless Fidelity), GNS (Global Navigation System), and NFC (Near Field Communication). To save PCB (Printed Circuit Board) area and cost single 'free running' XO (Crystal Oscillator) for all of these standards are desirable. However this may introduce very narrow spaced Continues Wave (CW) interference, also referred to as spurs.

E.g. let's assume a scenario where an un-tuned 26 MHz XO causes a CW interference at the receiver input, which receives at n times 962 MHz (assuming that an RF Phase Locked Loop (PLL) uses Automatic Frequency Control (AFC) correction).

AFC is $$AFC=(962\ MHz-1\ kHz)/962\ MHz$$

$$n*37*26\ MHz/AFC-n*962\ MHz=1\ kHz, 2\ kHz, 3\ kHz \ldots,$$

where n=[1, 2, 3 . . . ].

Therefore the CW interference will be present in the equivalent receiver base band signal at n*1 kHz as narrow spaced CW tones.

BRIEF DESCRIPTION OF THE FIGURES

Some examples of circuits, apparatuses, methods and/or computer programs will be described in the following by way of example only, and with reference to the accompanying figures, in which.

DETAILED DESCRIPTION

Figure 1:
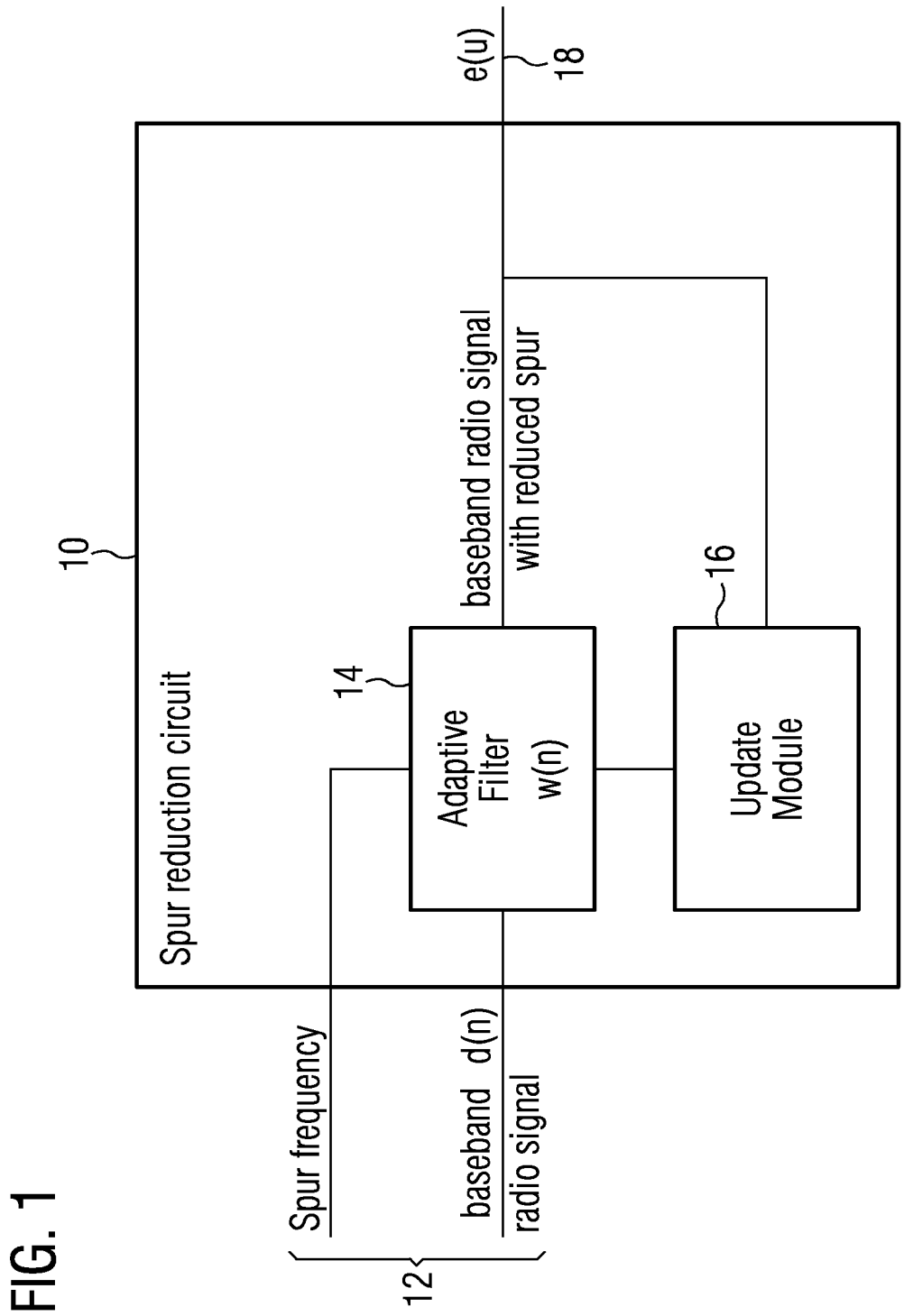
FIG. 1 illustrates an example of a spur reduction circuit.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples are based on the finding that the number of spur cancellers used in radio front ends has become a relevant contributor to chip space consumption of Radio Frequency (RF) component implementation. For example, 16*8=128 spur cancelers (described below) are used per transceiver. Examples may reduce the number of complex multiplier in a spur reduction circuit and may therewith save chip space and allow for power savings. Examples provide a way for unwanted signal (spur) removal or reduction using an adaptive filter. In some examples such an adaptive filter may use a Least Mean Square (LMS) adaptive filter with a single mixer per spur compared to other implementations with two mixers per spur.

FIG. 1 illustrates an example of a spur reduction circuit 10, which is configured to reduce spur interference in a baseband radio signal, d(n), where n is a positive integer indexing samples. In further examples the spur reduction circuit 10 can be any spur reduction apparatus, module, device, unit, etc. The baseband radio signal is assumed to be a digital baseband signal having been converted from a transmission or radio band to the baseband. The samples of the baseband signal are subsequently indexed by n. For example, the baseband signal can be based on an analog radio signal, which was converted to the baseband and then digitized, i.e. converted by an Analog-Digital-converter (AD).

The spur reduction circuit 10 comprises at least one input 12 for the baseband radio signal, d(n), and information on at least one spur frequency, $\omega(n)$. In examples the input 12 may be implemented as one or more contacts, units, modules, devices, any means for inputting, pins or input registers that allow providing the corresponding signals and information. As further shown in FIG. 1 the spur reduction circuit 10 further comprises an adaptive filter 14, which is configured to filter the baseband radio signal, d(n), to obtain a baseband radio signal with reduced spur interference, e(n). The adaptive filter 14 may be implemented as any means for filtering adaptively, one or more filter modules, units, devices, as a Finite Impulse Response (FIR) filter, an Infinite Impulse Response (IIR) filter, in hardware, such as an Application Specific Integrated Circuit (ASIC), or in software being executable on any programmable hardware, such as on a processor, a Digital Signal Processor (DSP) etc. The adaptive filter 14 is further configured to filter the baseband radio signal, d(n), based on at least one filter coefficient, w(n), and based on the information on the at least one spur frequency, $\omega(n)$. The at least one filter coefficient can be an analog or digital signal, representing a real or complex filter coefficient w(n).

As can be further seen in FIG. 1 the spur reduction circuit comprises an update module 16, which is configured to adapt the at least one filter coefficient, w(n), based on the baseband radio signal with reduced spur interference e(n). The update module 16 may be any means for updating, one or more update units, devices, etc. For example, the update module 16 can be implemented as hardware, e.g. an ASIC, or in software being executable on any programmable hardware, such as on a processor, a DSP etc. In some examples the adaptive filter and the update module may be implemented in software being executable on the same programmable hardware component, e.g. a DSP. The example of the spur reduction circuit 10 further comprises at least one output 18 for the baseband signal with reduced spur interference e(n). The at least one output 18 may be implemented as one or more contacts, units, modules, devices, any means for outputting, pins or output registers that allow providing the corresponding signals and information. As shown in FIG. 1 the input 12, the output 18 and the update module 16 are coupled to the adaptive filter 14. The update module 16 is also coupled to the output 18.

Figure 2:
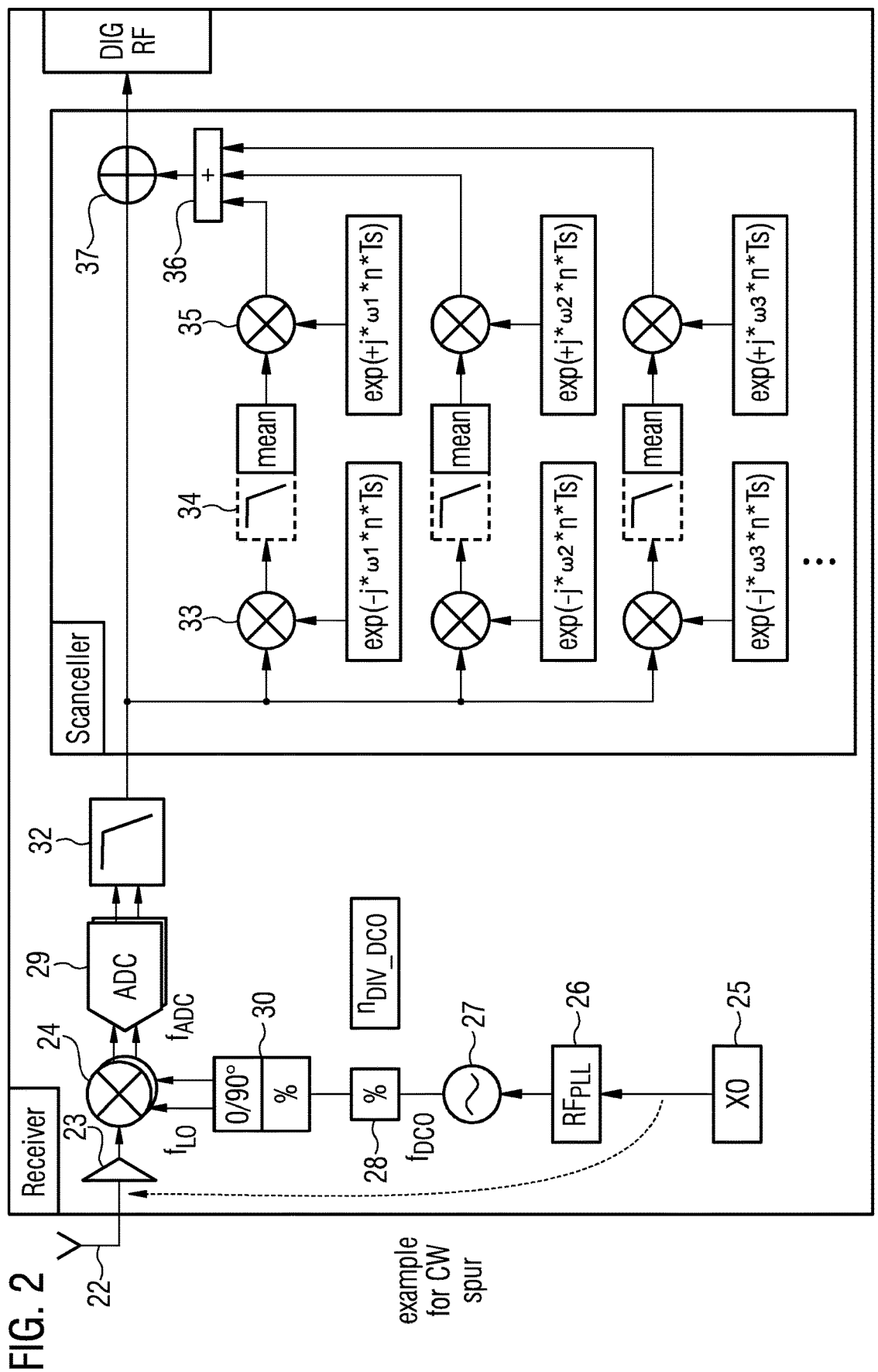
FIG. 2 shows an exemplary radio receiver path with a spur canceller.

FIG. 2 shows a radio receiver path 20 with a spur canceller 21, which is used to explain spur development in an example. As shown in FIG. 2 a receive antenna 22 is coupled to a Low Noise Amplifier (LNA) 23, the output of which is converted to the baseband by complex converter/mixer 24. An XO 25 generates a reference oscillating signal, which is stabilized by an RF Phase Locked Loop (PLL) 26. The output of the PLL 26 controls a Digitally Controlled Oscillator (DCO) 27 at frequency $f_{DCO}$, which is then divided by $n_{DIV\_DCO}$ 28, which is then provided to the mixer 24. A further division and/or generation of a 90° shifted input signal for the quadrature component can be carried out in block 30. The ADC 29 converts the down-mixed signal, which is then low pass filtered by filter 32. For example, due to imperfections of the components and the implementation, crosstalk between the receiver path shown in FIG. 2 and a parallel transmitter path, some continuous wave interference or spur may occur or couple into the receiver path, e.g. at the input of the LNA 23. Such interference is then also mixed by mixer 24 and hence reproduced in the spectrum. The spur canceller 21 then attempts to reduce these spurs by generating and adding one or more complementary/correction signals to the output of the low pass filter 32.

In the spur canceller 21 the output of the low pass filter 32 is processed in multiple parallel paths, each of which attempts to generate a complementary signal for one spur. In a first path shown in FIG. 2 an oscillating signal is generated based on a first estimated spur frequency $\omega 1$ (exp$(-j*\omega 1*T_s)$, which is mixed (multiplied) with the output of the low pass filter 32 using mixer 33, where $T_s=1/f_s$ and $f_s$ is the sample frequency. The relevant spur frequency is then shifted in the spectrum to 0/Direct Current (DC). A subsequent further low pass filter and averaging module 34 reduces image frequencies and noise to isolate the spur at DC. A subsequent further mixer 35 then shifts the isolated spur back to its original frequency in the output signal of the low pass filter 32 to obtain the complementary/correction signal component for col. As shown in FIG. 2 the procedure can be repeated in parallel for other estimated spur frequencies to generate further complementary component signals at further spur frequencies $\omega 2$, $\omega 3$, . . . the complementary/correction signal components are then added by adder 36, before being subtracted using the adder 37. Ideally, the spurs are then eliminated from the signal before being output for further digital processing.

The concept explained in FIG. 2 supports multiple narrow spaced CW interference cancelers. The CW tone is mixed to a spectral position f=0 Hz, by mixer 33. The inphase (I) and quadrature (Q) components of this signal are averaged mean(I)+j*mean(Q). The signal can be optionally filtered before averaging 34 to remove blocking signals. This structure may require two mixers 33, 35 per CW tone (Single Side Band (SSB) tones assumed). Therefore area and power for two mixers 33, 35 are consumed. The bandwidth (BW) is constituted with the averaging period 34 and therefore flexibility to compromise settling time and filter BW may be limited. The feed forward structure sees all CW interferers without suppression which may require several milliseconds of settling time in case of multiple narrow spaced spurs. CW tones may typically be 10 . . . 25 dB higher compared to the entire received signal without spurs. Not removing the other spurs before estimating the "canceling spur" may result in degradations Examples may use multiple low complexity Least Mean Square (LMS) adaptive filters with single summation point for cancel/complementary signals in combination with stochastic gradient step-size control. In the following, a further example for unwanted signal removal will be described. Examples may further enable removal of flicker and phase noise due to flexible BW control and may be used for receiving and/or transmitting paths of a transceiver.

Figure 3:
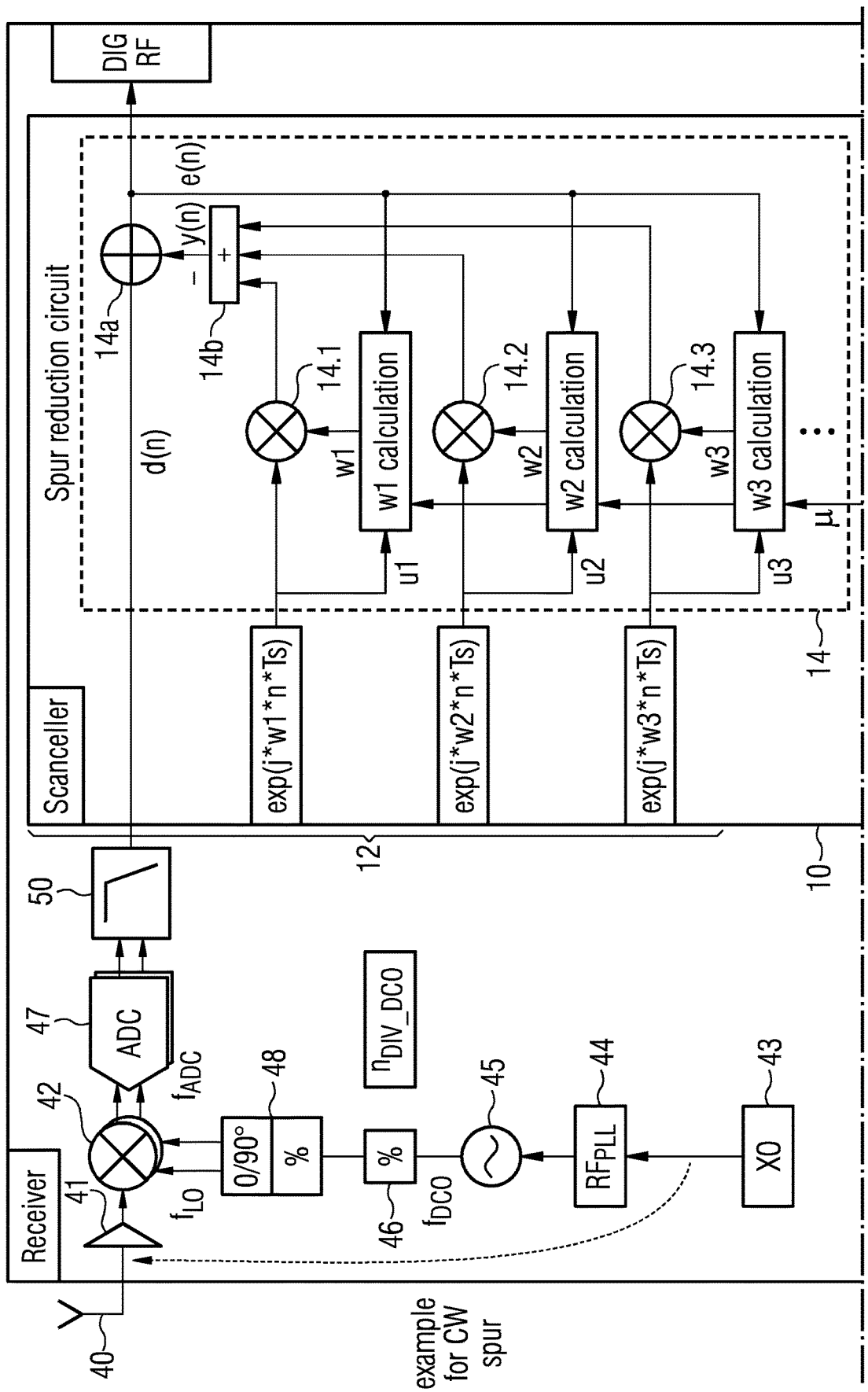
FIG. 3 depicts a block diagram of an example of a spur reduction circuit implemented in an example of a radio transceiver.
Figure 3:
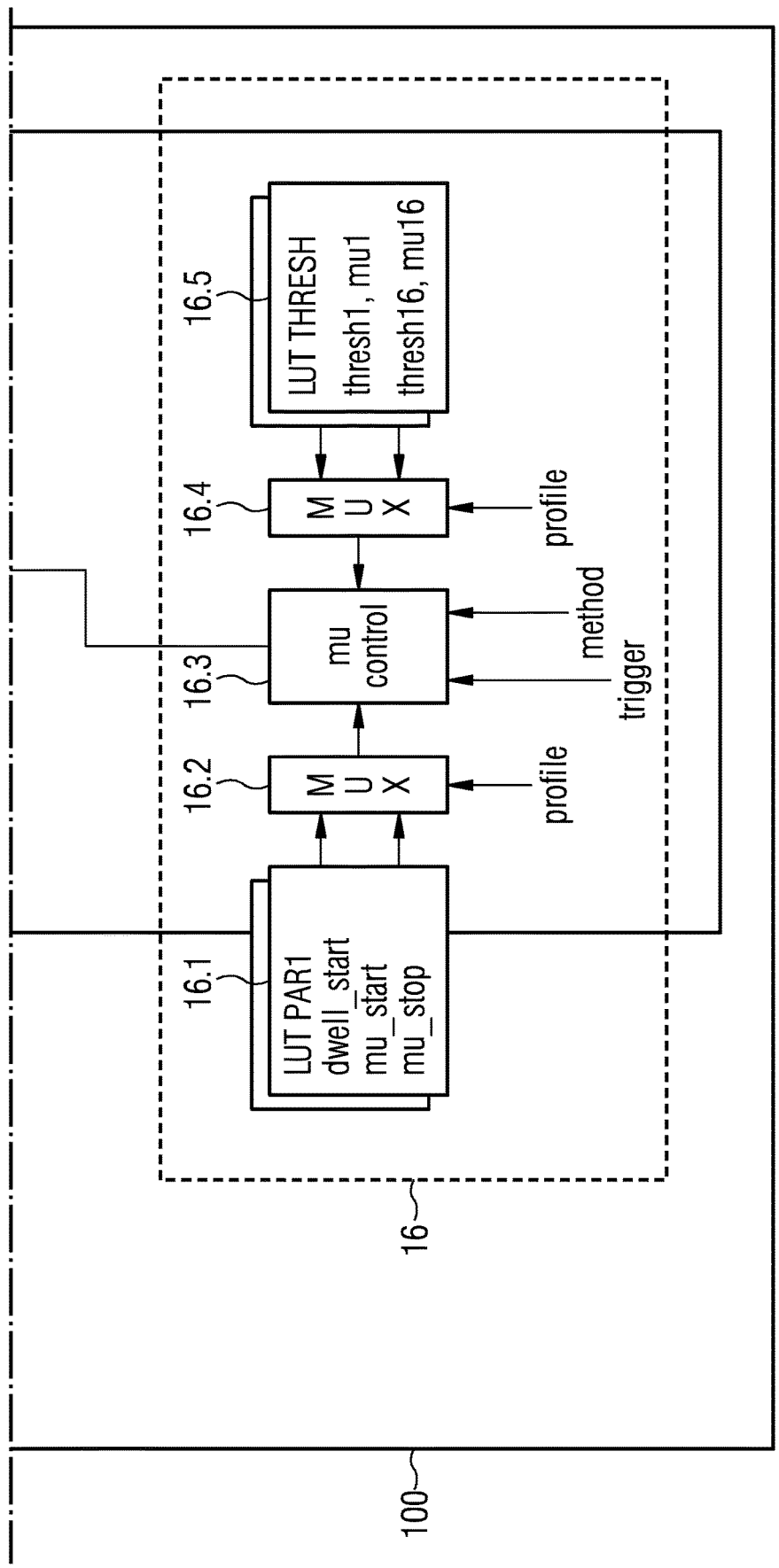

FIG. 3 depicts a block diagram of an example of a spur reduction circuit 10 (also referred to as Scanceler) implemented in an example of a radio transceiver 100. The radio transceiver 100 comprises an example of the spur reduction circuit 10 according to the above. In further examples the radio transceiver 100 may comprise radio frequency front-end circuits and a down-conversion circuit configured to convert a received radio signal into the baseband radio signal.

In the example shown in FIG. 3 similar components are used for the radio front end processing. A receiver antenna 40 is coupled to a Low Noise Amplifier (LNA) 41, the output of which is converted to the baseband by complex converter/mixer 42. An XO 43 generates a reference oscillating signal, which is stabilized by an RF PLL 44. The output of the PLL 44 controls a DCO 45 at frequency $f_{DCO}$, which is then divided by $n_{DIV\_DCO}$ 46, which is then provided to the mixer 42 and an ADC 47. Potentially, a further division 48 is applied at the respective input of the mixer 42 together with generation of a 90° shifted input signal for the quadrature component. The ADC 47 converts the down-mixed signal, which is then low pass filtered by filter 50. For example, due to imperfections of the components and the implementation, crosstalk between the receiver path shown in FIG. 3 and a parallel transmitter path, some continuous wave interference or spur may occur or couple into the receiver path, e.g. at the input of the LNA 41, similar to the effects described above.

An example of the above described spur reduction circuit 10 is the provided with the output signal of the low pass filter 50 as baseband radio signal. In the example shown in FIG. 3 the spur reduction circuit 10 has multiple inputs 12, one for the baseband signal and several others for the information on the spur frequency, which are referred to as ω1, ω2, ω3 etc. in FIG. 3. For example, oscillation signals at the respective spur frequencies may be provided to the spur reduction circuit 10 ($\exp(-j*\omega1*T_s$, $\exp(-j*(\omega2*T_s$, $\exp(-j*(\omega3*T_s$, etc.). The information on at least one spur frequency, ω(n), may comprise digital samples of at least one continuous wave signal u(n) with the at least one spur frequency ω(n), which are indicated in FIG. 3 by $un=e^{j\omega n*n*Ts}$, n=1, 2, 3, . . . .

In the example shown in FIG. 3 the adaptive filter 14 is configured to multiply the digital samples of each continuous wave signal, u(n), with one filter coefficient, w(n) (w1, w2, w3, . . . in FIG. 3), to obtain at least one correction signal, y(n). The adaptive filter 14 comprises one multiplier 14.1, 14.2, 14.3, etc. per parallel path and similar to the above, one of the parallel paths cancels or reduces one spur. The at least one input 12 for the baseband radio signal, d(n), and the information on at least one spur frequency, is configured to obtain information on a plurality of spur frequencies, $\omega_m(n)$, m indexing the spur frequencies. The adaptive filter 14 is further configured to filter the baseband radio signal, d(n), based on a plurality of filter coefficients, $w_m(n)$, and based on the information on the plurality of spur frequencies, $\omega_m(n)$. The update module 16 is configured to adapt the plurality of filter coefficients, $w_m(n)$, based on the baseband radio signal with reduced spur interference e(n).

Each of the parallel paths delivers a correction component or complementary component for one spur frequency by multiplying the respective CW signal u1, u2, u3, . . . , with the complex coefficient w1, w2, w3, . . . . The complex coefficients are updated iteratively. Accordingly, the update module 16 is configured to update one filter coefficient, w(n), per continuous wave signal u(n), iteratively.

An updated filter coefficient, w(n+1), is based or depends on a previous filter coefficient, w(n), and a relation between samples of the baseband radio signal, d(n), and the baseband radio signal with reduced spur interference e(n). The updated filter coefficient, w(n+1), further is based or depends on the weighting factor, μ, weighting a combination of the baseband radio signal, d(n), and the baseband radio signal with reduced spur interference e(n), or a combination of the baseband radio signal, d(n), and the sign of the baseband radio signal with reduced spur interference e(n). In line with FIG. 3

$$w_m(n+1)=w_m(n)-\mu*\text{conj}(u_m)*\text{sign } c(e(n)),$$

in which n is the iteration/time index and m indexes the path/branch, and $$\text{sign } c(n+jn)=\text{sign}(\text{real}(n))+j \text{ sign}(\text{img}(n)).$$

As shown in FIG. 3, the adaptive filter 14 is configured to combine (or comprise a combiner 14a, 14b to combine) the baseband radio signal, d(n), with the correction signal y(n), to obtain the baseband radio signal with reduced spur interference e(n). The adaptive filter 14 utilizes combiner 14a to combine the baseband radio signal and the correction signal. As can be further seen in FIG. 3 the correction signal y(n) is composed of the signal components of the parallel paths, i.e. spur complementary signals, which are combined by another combiner 14b.

In examples, there are multiple options or variants on how the signals are combined and the coefficients or weighting factors updated as will be detailed in the sequel. For example, the adaptive filter 14 can be configured to combine (or comprise a combiner 14a, 14b to combine) a sign of the baseband radio signal, d(n), with a sign of the correction signal y(n), to obtain the baseband radio signal with reduced spur interference e(n). The adaptive filter (14) may be configured to determine the baseband radio signal with reduced spur interference e(n) based on an exclusive-or combination of the signs of the baseband radio signal, d(n), and the correction signal y(n). In the example of FIG. 3, the update module 16 is configured to update the weighting factor, μ.

The adaptive filter 14 is based on an LMS adaptive filter. This structure (Scanceler) has one summation point for all the canceling signal components $y_m(n)$ to sum up to one common error signal y(n). This may cause any Scanceler or spur reduction circuit 10 to see no additional CW spur after all Scancelers (parallel paths) are settled to asymptotic performance, in case for spur signals only at Scanceler input.

Calculation of coefficients $w_m(n)$ can be done with the following formulas, again n being the time index and m indexing the parallel path or branch in FIGS. 2, 3.

$$y(n)=\text{sum}_{over\_m}(w_m(n)*u_m(n)),$$

$$e(n)=d(n-y(n), \text{ and}$$

$$w_m(n+1)=w_m(n)-\mu*\text{conj}(u_m(n))*e(n), \qquad \text{FORMULA 1:}$$

where conj( ) is the complex conjugate operation. However in another example the following formulas are used to reduce area and power:

$$y(n)=\text{sum}_{over\_m}(w_m(n)*u_m(n)),$$

$$e(n)=\text{sign } c(d(n))-\text{sign } c(y(n)), \text{ and}$$

$$w_m(n+1)=w_m(n)-\mu*\text{conj}(u_m(n))*e(n), \qquad \text{FORMULA 2:}$$

where signc( ):=signum(real(x))+j*signum(imag(x)).

Where the multiplication of conj($u_m(n)$)*e(n) with μ can be implemented in a shift implementation compared to a real or actual multiplier to further save power.

In examples, there are different options on how the weighting factor μ can be updated. For example, the update module 16 may be is configured to decrease the weighting factor, μ, with an increasing number of filtered samples.

Some more specific examples are:

1. $\mu=\mu_{start}/n$, where n starts to count with a trigger signal and is incremented with each input sample;

2. μ can be based on a Look-up Table (LUT) with entries for threshold values and $\mu_{1 \ldots N}$ values. Again a counter is started with a trigger signal and is incremented at each input sample. When the counter is equal to the LUT threshold value μ is set to the corresponding LUT entry for μ; and 3. After trigger the $\mu_{dwell}$ value is set to $\mu_{dwell\_start}$ (e.g. 2) and the counter is started. After the counter reaches $\mu_{dwell}$ the μ value is set to μ=μ/2, the counter is reset to one and $\mu_{dwell}=\mu_{dwell}*2$. This process may repeat until $\mu_{dwell\_stop}$ is reached.

FIG. 3 shows an implementation of the update module 16 using a first LUT 16.1 from which different profiles for $\mu_{start}$, $\mu_{stop}$, $\mu_{dwell\_start}$, $\mu_{dwell\_stop}$, are selected via multiplexer 16.2 and provided to a μ-controller 16.3. The μ-controller 16.3 can be triggered with a trigger signal and a respective method for updating μ can be selected. Via a second multiplexer 16.4 different profiles for threshold may be selected form a second LUT 16.5, e.g. thresh1, mu1, . . . thresh16, mu16. The implementation shown in FIG. 3 allows selecting among different profiles and updating methods for the weighting factors μ.

In some examples the update module 16 may be configured to obtain the weighting factor, μ, by initiating the weighting factor, μ, with an initial value for an initial count of samples, e.g. $\mu_{start}$, by lowering the initial value for an increased subsequent count of samples, e.g. $\mu=\mu_{start}/n$, and repeating lowering the weighting factor, μ, and increasing the count of samples until a predetermined end value or sample count is reached, e.g. $\mu_{end}$.

In another example the update module 16 may be configured to obtain the weighting factor, μ, by initiating the weighting factor, $\mu=\mu_{dwell\_start}$, with the initial value for the initial value of samples, $\mu_{dwell}$, by lowering the initial value by 50%, μ=μ/2, for a doubled subsequent count of samples, and repeating lowering by 50% the weighting factor, μ, and doubling the count of samples, $\mu_{dwell}=\mu_{dwell}*2$, until a predetermined end value or sample count is reached, $\mu_{dwell\_stop}$, cf. above option 3. This example may lead to a Kalman filter characteristic (divide μ in half, and remain with that value for twice as long).

In some examples the update module 16 is configured to adapt the initial value or the predetermined end value or both, based on a relation of two or more elements of the group of a spur level, a carrier level and a noise level of the baseband radio signal. For example, the update module 16 may be configured to select a first lower initial value for a first lower spur-to-carrier-and-noise-level and the update module 16 may be configured to select a second higher initial value for a second higher spur-to-carrier-and-noise-level.

Examples may hence consider a spur level in relation to a carrier and noise level. In case these levels are known or estimates thereof can be determined the initial weighting factor μ or end value can be adapted accordingly. It is noted that the weighting factor μ determines the bandwidth of the estimation or adaptive filter 14. If a spur-to-carrier-and-noise ratio is high a large bandwidth should selected and accordingly a high weighting factor μ to effect a fast reduction or cancellation of the CW spur. Hence, a good quality of the baseband radio signal with reduced spur would result quicker. If the spur-to-carrier-and-noise ratio is low, it may be more beneficial to start with a smaller bandwidth, i.e. with a lower weighting factor μ.

The update module 16 may be configured to reset the weighting factor, μ, to the initial value, in case changes of the baseband radio signal with reduced spur interference e(n) remain below a predetermined threshold for a predetermined time, or in case a sign of the baseband radio signal with reduced spur interference e(n) remains constant for the predetermined time. For example, signc(e(n)) may be monitored and if it remains constant for a predetermined time, μ is reset to an initial value, and a reiteration is started until an end value is reached. In case signc(e(n)) remains constant for a predetermined amount of time, it is likely that the spur (CW) signal has changed in phase and/or amplitude and needs to be reestimated. This may occur if re-configurations of the RF-front end are carried out or other blocks are switched on or off, if the supply voltages change, etc.

The update module 16 can be configured to obtain the weighting factor, μ, from a look-up table, wherein the look-up table assigns weighting factors, μ, to a count of filtered samples, as indicated in FIG. 3.

Figure 4:
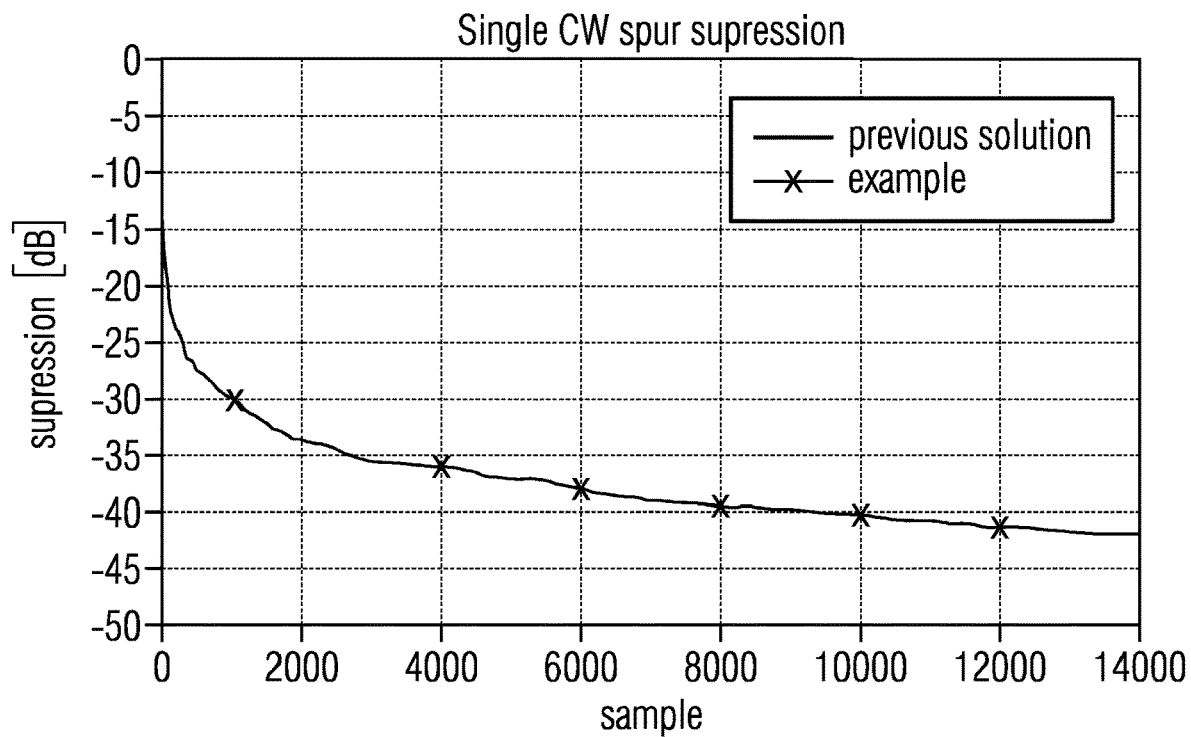
FIG. 4 shows a view chart illustration of spur suppression in an example.

The above first example may require one division and is therefore not further discussed. However a comparison of the previous solution for the Scanceler of FIG. 2 and an example FIG. 3 (this time with $\mu=\mu_{start}/n$) is shown is FIG. 4. FIG. 4 shows a view chart illustration of spur suppression in an example. FIG. 4 shows sample count on the abscissae and CW suppression of one CW spur on the ordinate in dB. FORMULA 1 was used with single CW spur with equal power for spur and input noise. The BWs of the spur estimators are equal and an average over 100 runs is depicted.

Figure 5:
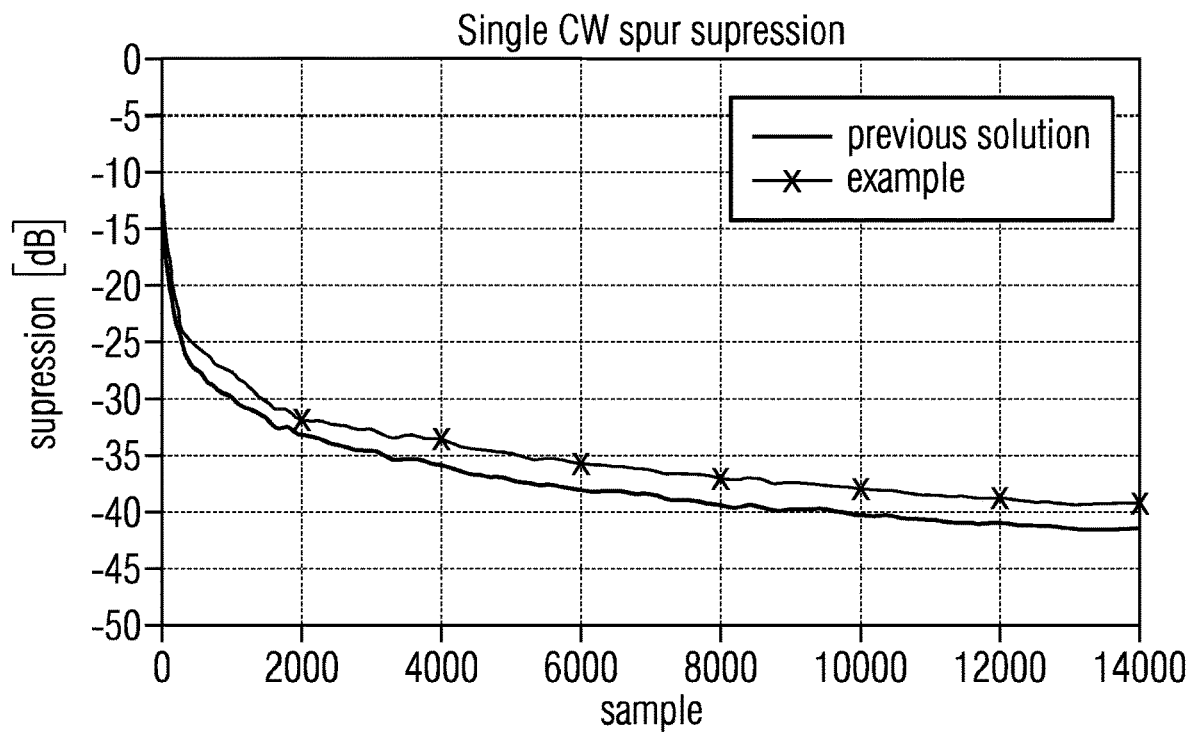
FIG. 5 shows a view chart illustration of spur suppression in another example with an alternative updating concept.

Both solutions show exactly the same performance (curves are exactly overlapping). FIG. 5 shows a view chart illustration of spur suppression in line with FIG. 4 in another example with an alternative updating concept using the above FORMULA 2. The simulation is repeated with the same settings but using FORMULA 2, which causes a degrade of about 2 dB of the suppression performance of the example (indicated by the x-marked line in the Figs) but saves at least one multiplier.

Figure 6:
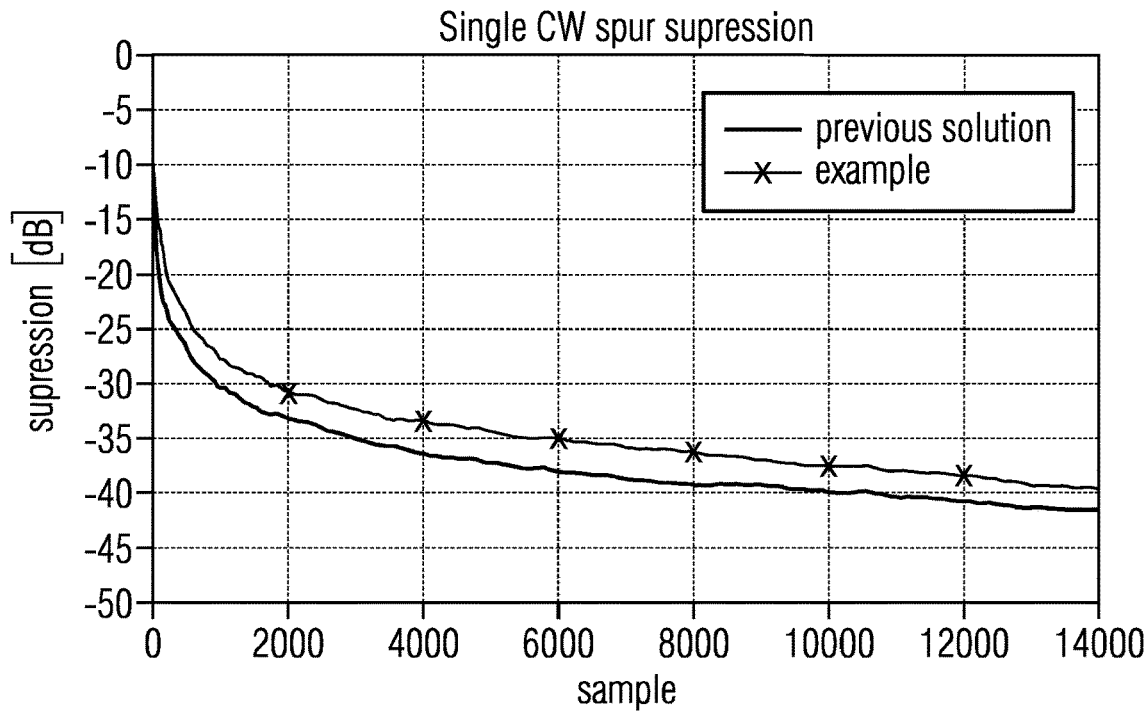
FIG. 6 shows a view chart illustration of spur suppression in another example with an alternative updating concept.

FIG. 6 shows a view chart illustration of spur suppression in another example with an alternative updating concept. The same configuration is used but the above option 3 for updating (μ, ($\mu_{start}=1$, $\mu_{dwell\_start}=1$). The result is quite comparable but also shows a further degradation by additional 0.5 dB due to not optimal μ setting versus time.

Figure 7:
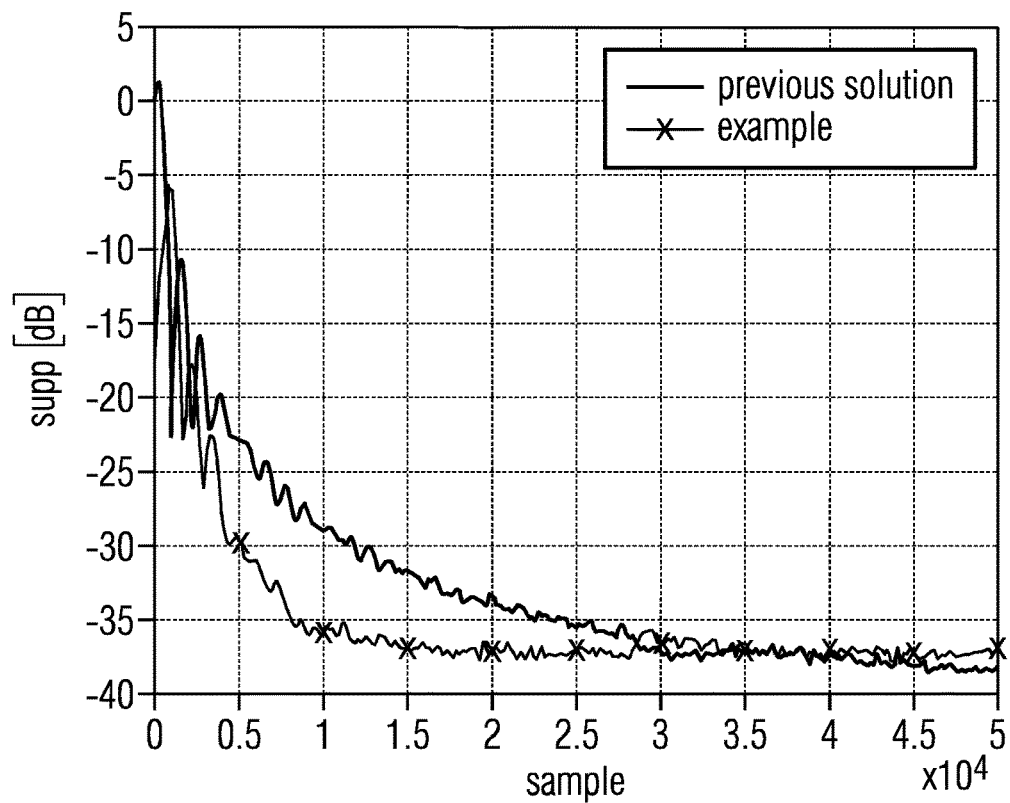
FIG. 7 shows a view chart illustration of spur suppression with an added spur in an example.

FIG. 7 shows a view chart illustration of spur suppression with an added spur in an example. One additional CW spur with a level of 6 dB above input noise is added to the otherwise same configuration of the previous simulations. The frequency of the additional spur is increased is steps compared to the frequency of the first spur, where the frequency offsets are shown on the abscissae and the suppression performance in dB on the ordinate, $\mu_{start}=1$, $\mu_{dwell\_start}=1$). The example shows performance improvements when the second spur frequency has an offset between 0 . . . 40 kHz.

According to the interference situation, e.g. CW spur frequency spacing, the best μ adaption (profile) can be used to optimize spur suppression and therefore system performance in examples. Examples' μ adaption shows similar performance for single spur or >40 kHz spaced spurs. Performance is improved for narrow spaced spurs <40 kHz. Examples may require only one complex multiplication compared to other solutions. Examples may have adjustable bandwidth to cancel also phase- and flicker-noise.

Figure 8:
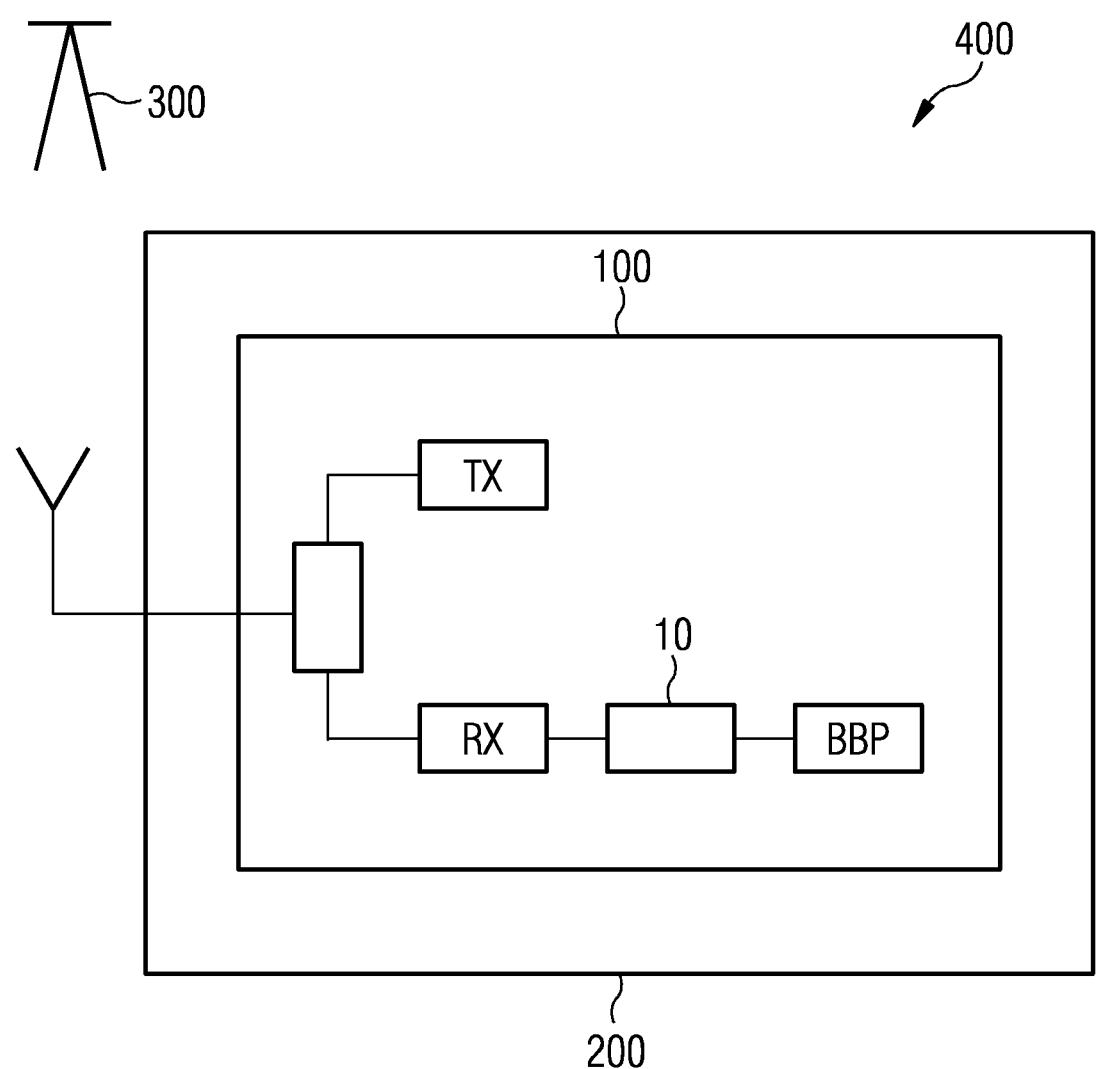
FIG. 8 shows examples of a mobile terminal, a base station transceiver and a mobile communication system.

FIG. 8 shows examples of a mobile terminal 200, a base station transceiver 300 and a mobile communication system 400. The mobile terminal comprises an example of the transceiver 100 having typical radio transceiver components, such one or more antennas, diplexers/duplexers, amplifiers, filters transmitter path, receiver path, an example of the above described spur reduction circuit, BaseBand Processing (BBP) means or modules, etc. The example of the base station transceiver 300 also comprises an example of the transceiver 100, which is not detailed in FIG. 8 for overview purposes.

Such a mobile communication system 400 may correspond, for example, to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G) and may use mm-Wave technology. The mobile communication system 400 may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station 300 or base station transceiver can be operable to communicate with one or more active mobile transceivers or terminals 200 and a base station transceiver can be located in or adjacent to a coverage area of another base station transceiver, e.g. a macro cell base station transceiver or small cell base station transceiver. Hence, examples may provide a mobile communication system 400 comprising one or more mobile transceivers 200 and one or more base station transceivers 300, wherein the base station transceivers may establish macro cells or small cells, as e.g. pico-, metro-, or femto cells. A mobile transceiver 200 may correspond to a smartphone, a cell phone, user equipment, a laptop, a notebook, a personal computer, a Personal Digital Assistant (PDA), a Universal Serial Bus (USB)-stick, a car, etc. A mobile transceiver 200 may also be referred to as UE or mobile in line with the 3GPP terminology.

A base station transceiver 300 can be located in the fixed or stationary part of the network or system. A base station transceiver 300 may correspond to a remote radio head, a transmission point, an access point, a macro cell, a small cell, a micro cell, a femto cell, a metro cell, etc. A base station transceiver 300 can be a wireless interface of a wired network, which enables transmission of radio signals to a UE or mobile transceiver 200. Such a radio signal may comply with radio signals as, for example, standardized by 3GPP or, generally, in line with one or more of the above listed systems. Thus, a base station transceiver 300 may correspond to a NodeB, an eNodeB, a Base Transceiver Station (BTS), an access point, a remote radio head, a transmission point, etc., which may be further divided into a remote unit and a central unit.

Figure 9:
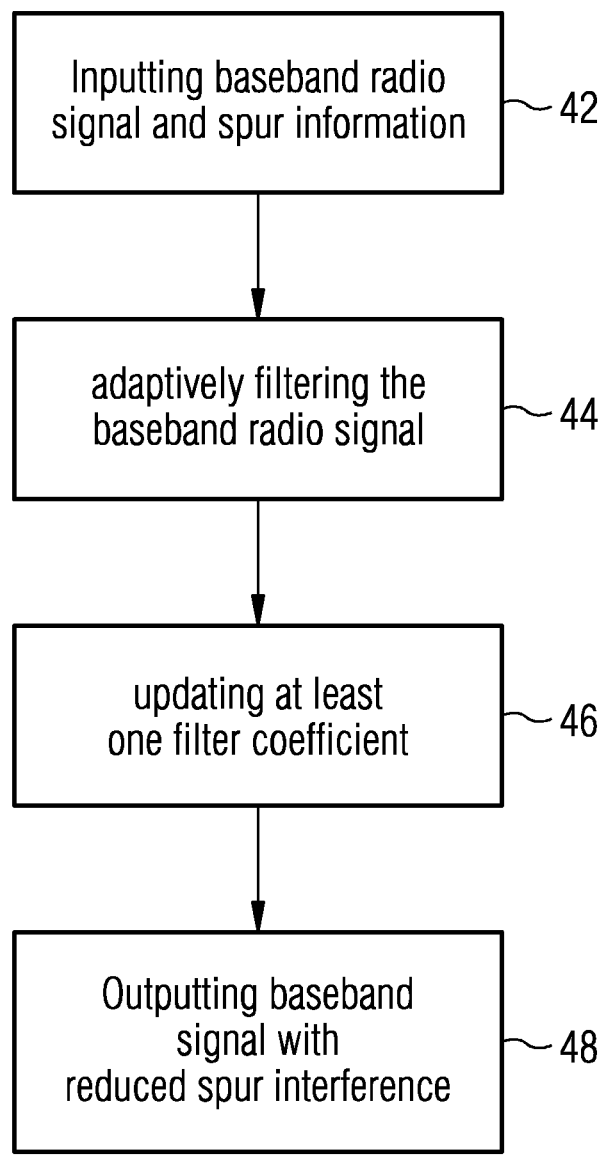
FIG. 9 depicts a block diagram of an example of a method for reducing spur interference.

FIG. 9 depicts a block diagram of an example of a method for reducing spur interference in a baseband radio signal, d(n), n indexing samples. The method comprises inputting 42 the baseband radio signal, d(n), and information on at least one spur frequency, ω(n). The method further comprises adaptively filtering 44 the baseband radio signal, d(n), to obtain a baseband radio signal with reduced spur interference, e(n), based on at least one filter coefficient, w(n), and based on the information on the at least one spur frequency, ω(n). The method further comprises updating 46 the at least one filter coefficient, w(n), based on the baseband radio signal with reduced spur interference e(n), and outputting 48 the baseband signal with reduced spur interference e(n).

Another example is a computer program having a program code for performing at least one of the methods described herein, when the computer program is executed on a computer, a processor, or a programmable hardware component. Another example is a machine readable storage including machine readable instructions, when executed, to implement a method or realize an apparatus as described herein. A further example is a machine readable medium including code, when executed, to cause a machine to perform any of the methods described herein.

The examples as described herein may be summarized as follows:

Example 1 is a spur reduction circuit (10) configured to reduce spur interference in a baseband radio signal, d(n), n indexing samples, the spur reduction circuit (10) comprising at least one input (12) for the baseband radio signal, d(n), and information on at least one spur frequency, ω(n);

an adaptive filter (14) configured to filter the baseband radio signal, d(n), to obtain a baseband radio signal with reduced spur interference, e(n), the adaptive filter (14) being further configured to filter the baseband radio signal, d(n), based on at least one filter coefficient, w(n), and based on the information on the at least one spur frequency, ω(n);

an update module (16) configured to adapt the at least one filter coefficient, w(n), based on the baseband radio signal with reduced spur interference e(n); and at least one output (18) for the baseband signal with reduced spur interference e(n).

Example 2 is the spur reduction circuit (10) of example 1, wherein the information on at least one spur frequency, ω(n), comprises digital samples of at least one continuous wave signal u(n) with the at least one spur frequency ω(n).

Example 3 is the spur reduction circuit (10) of example 2, wherein the adaptive filter (14) is configured to multiply the digital samples of each continuous wave signal, u(n), with one filter coefficient, w(n), to obtain at least one correction signal, y(n).

Example 4 is the spur reduction circuit (10) of example 3, wherein the adaptive filter (14) comprises at least one combiner (14a; 14b) to combine the baseband radio signal, d(n), with the correction signal y(n), to obtain the baseband radio signal with reduced spur interference e(n).

Example 5 is the spur reduction circuit (10) of example 4, wherein the combiner (14a; 14b) is further configured to combine a sign of the baseband radio signal, d(n), with a sign of the correction signal y(n), to obtain the baseband radio signal with reduced spur interference e(n).

Example 6 is the spur reduction circuit (10) of example 5, wherein the adaptive filter (14) is configured to determine the baseband radio signal with reduced spur interference e(n) based on an exclusive-or combination of the signs of the baseband radio signal, d(n), and the correction signal y(n).

Example 7 is the spur reduction circuit (10) of one of the examples 2 to 6, wherein the update module (16) is configured to update one filter coefficient, w(n), per continuous wave signal u(n), iteratively.

Example 8 is the spur reduction circuit (10) of example 7, wherein an updated filter coefficient, w(n+1), is based on a previous filter coefficient, w(n), and a relation between samples of the baseband radio signal, d(n), and the baseband radio signal with reduced spur interference e(n).

Example 9 is the spur reduction circuit (10) of one of the examples 7 or 8, wherein an updated filter coefficient, w(n+1), is based on a previous filter coefficient, w(n), and a relation between samples of the baseband radio signal, d(n), and a sign of the baseband radio signal with reduced spur interference e(n).

Example 10 is the spur reduction circuit (10) of one of the examples 8 or 9, wherein the updated filter coefficient, w(n+1), further is based on a weighting factor, $\mu$, weighting a combination of the baseband radio signal, d(n), and the baseband radio signal with reduced spur interference e(n), or a combination of the baseband radio signal, d(n), and the sign of the baseband radio signal with reduced spur interference e(n).

Example 11 is the spur reduction circuit (10) of example 10, wherein the update module (16) is configured to update the weighting factor, $\mu$.

Example 12 is the spur reduction circuit (10) of example 11, wherein the update module (16) is configured to decrease the weighting factor, $\mu$, with an increasing number of filtered samples.

Example 13 is the spur reduction circuit (10) of example 11, wherein the update module (16) is configured to obtain the weighting factor, $\mu$, by initiating the weighting factor, $\mu$, with an initial value for an initial count of samples, by lowering the initial value for an increased subsequent count of samples, and repeating lowering the weighting factor, $\mu$, and increasing the count of samples until a predetermined end value or sample count is reached.

Example 14 is the spur reduction circuit (10) of example 13, wherein the update module (16) is configured to obtain the weighting factor, $\mu$, by initiating the weighting factor, $\mu$, with the initial value for the initial count of samples, by lowering the initial value by 50% for a doubled subsequent count of samples, and repeating lowering by 50% the weighting factor, $\mu$, and doubling the count of samples until a predetermined end value or sample count is reached.

Example 15 is the spur reduction circuit (10) of one of the examples 13 or 14, wherein the update module (16) is configured to adapt the initial value or the predetermined end value or both, based on a relation of two or more elements of the group of a spur level, a carrier level and a noise level of the baseband radio signal.

Example 16 is the spur reduction circuit (10) of example 15, wherein the update module (16) is configured to select a first lower initial value for a first lower spur-to-carrier-and-noise-level and wherein the update module (16) is configured to select a second higher initial value for a second higher spur-to-carrier-and-noise-level.

Example 17 is the spur reduction circuit (10) of one of the examples 13 to 16, wherein the update module (16) is configured to reset the weighting factor, $\mu$, to the initial value, in case changes of the baseband radio signal with reduced spur interference e(n) remain below a predetermined threshold for a predetermined time, or in case a sign of the baseband radio signal with reduced spur interference e(n) remains constant for the predetermined time.

Example 18 is the spur reduction circuit (10) of example 11, wherein the update module (16) is configured to obtain the weighting factor, $\mu$, from a look-up table, wherein the look-up table assigns weighting factors, $\mu$, to a count of filtered samples.

Example 19 is the spur reduction circuit (10) of one of the examples 1 to 18, wherein the at least one input (12) for the baseband radio signal, d(n), and the information on at least one spur frequency, is configured to obtain information on a plurality of spur frequencies, $\omega_m(n)$, m indexing the spur frequencies, wherein the adaptive filter (14) is further configured to filter the baseband radio signal, d(n), based on a plurality of filter coefficients, $w_m(n)$, and based on the information on the plurality of spur frequencies, $\omega_m(n)$, and wherein the update module (16) is configured to adapt the plurality of filter coefficients, $w_m(n)$, based on the baseband radio signal with reduced spur interference e(n).

Example 20 is a spur reduction apparatus (10) for reducing spur interference in a baseband radio signal, d(n), n indexing samples, the spur reduction apparatus (10) comprising means for inputting (12) the baseband radio signal, d(n), and information on at least one spur frequency, $\omega(n)$;

means for adaptively filtering (14) the baseband radio signal, d(n), to obtain a baseband radio signal with reduced spur interference, e(n), the means for adaptively filtering (14) being further configured for filtering the baseband radio signal, d(n), based on at least one filter coefficient, w(n), and based on the information on the at least one spur frequency, $\omega(n)$;

means for updating (16) the at least one filter coefficient, w(n), based on the baseband radio signal with reduced spur interference e(n); and means for outputting (18) the baseband signal with reduced spur interference e(n).

Example 21 is the spur reduction apparatus (10) of example 20, wherein the information on at least one spur frequency, $\omega(n)$, comprises digital samples of at least one continuous wave signal u(n) with the at least one spur frequency $\omega(n)$.

Example 22 is the spur reduction apparatus (10) of example 21, wherein the means for adaptively filtering (14) comprises means for multiplying the digital samples of each continuous wave signal, u(n), with one filter coefficient, w(n), to obtain at least one correction signal, y(n).

Example 23 is the spur reduction apparatus (10) of example 22, wherein the means for adaptively filtering (14) comprises means for combining (14a; 14b) the baseband radio signal, d(n), with the correction signal y(n), to obtain the baseband radio signal with reduced spur interference e(n).

Example 24 is the spur reduction apparatus (10) of example 23, wherein the means for adaptively filtering (14) comprises means for combining (14a; 14b) a sign of the baseband radio signal, d(n), with a sign of the correction signal y(n), to obtain the baseband radio signal with reduced spur interference e(n).

Example 25 is the spur reduction apparatus (10) of example 24, wherein the means for adaptively filtering (14) comprises means for determining the baseband radio signal with reduced spur interference e(n) based on an exclusive-or combination of the signs of the baseband radio signal, d(n), and the correction signal y(n).

Example 26 is the spur reduction apparatus (10) of one of the examples 21 to 25, wherein the means for updating (16) comprises means for updating one filter coefficient, w(n), per continuous wave signal u(n), iteratively.

Example 27 is the spur reduction apparatus (10) of example 26, wherein an updated filter coefficient, w(n+1), is based on a previous filter coefficient, w(n), and a relation between samples of the baseband radio signal, d(n), and the baseband radio signal with reduced spur interference e(n).

Example 28 is the spur reduction apparatus (10) of one of the examples 26 or 27, wherein an updated filter coefficient, w(n+1), is based on a previous filter coefficient, w(n), and a relation between samples of the baseband radio signal, d(n), and a sign of the baseband radio signal with reduced spur interference e(n).

Example 29 is the spur reduction apparatus (10) of one of the examples 27 or 28, wherein the updated filter coefficient, w(n+1), further is based on a weighting factor, $\mu$, weighting a combination of the baseband radio signal, d(n), and the baseband radio signal with reduced spur interference e(n), or a combination of the baseband radio signal, d(n), and the sign of the baseband radio signal with reduced spur interference e(n).

Example 30 is the spur reduction apparatus (10) of example 29, wherein the means for updating (16) comprises means for updating the weighting factor, $\mu$.

Example 31 is the spur reduction apparatus (10) of example 30, wherein the means for updating (16) comprises means for decreasing the weighting factor, $\mu$, with an increasing number of filtered samples.

Example 32 is the spur reduction apparatus (10) of example 31, wherein the means for updating (16) comprises means for obtaining the weighting factor, $\mu$, by initiating the weighting factor, $\mu$, with an initial value for an initial count of samples, by lowering the initial value for an increased subsequent count of samples, and repeating lowering the weighting factor, $\mu$, and increasing the count of samples until a predetermined end value or sample count is reached.

Example 33 is the spur reduction apparatus (10) of example 32, wherein the means for updating (16) comprises means for obtaining the weighting factor, $\mu$, by initiating the weighting factor, $\mu$, with the initial value for the initial count of samples, by lowering the initial value by 50% for a doubled subsequent count of samples, and repeating lowering by 50% the weighting factor, $\mu$, and doubling the count of samples until a predetermined end value or sample count is reached.

Example 34 is the spur reduction apparatus (10) of one of the examples 32 or 33, wherein the means for updating (16) comprises means for adapting the initial value or the predetermined end value or both, based on a relation of two or more elements of the group of a spur level, a carrier level and a noise level of the baseband radio signal.

Example 35 is the spur reduction apparatus (10) of example 34, wherein the means for updating (16) comprises means for selecting a first lower initial value for a first lower spur-to-carrier-and-noise-level and wherein the means for updating module (16) comprises means for selecting a second higher initial value for a second higher spur-to-carrier-and-noise-level.

Example 36 is the spur reduction apparatus (10) of one of the examples 22 to 35, wherein the means for updating (16) comprises means for resetting the weighting factor, $\mu$, to the initial value, in case changes of the baseband radio signal with reduced spur interference e(n) remain below a predetermined threshold for a predetermined time, or in case a sign of the baseband radio signal with reduced spur interference e(n) remains constant for the predetermined time.

Example 37 is the spur reduction apparatus (10) of example 36, wherein the means for updating (16) comprises means for obtaining the weighting factor, $\mu$, from a look-up table, wherein the look-up table assigns weighting factors, $\mu$, to a count of filtered samples.

Example 38 is the spur reduction apparatus (10) of one of the examples 20 to 37, wherein the means for inputting (12) the baseband radio signal, d(n), and the information on at least one spur frequency, comprises means for obtaining information on a plurality of spur frequencies, $\omega_m(n)$, m indexing the spur frequencies, wherein the means for adaptively filtering (14) comprises means for filtering the baseband radio signal, d(n), based on a plurality of filter coefficients, $w_m(n)$, and based on the information on the plurality of spur frequencies, $\omega_m(n)$, and wherein the means for updating (16) comprises means for adapting the plurality of filter coefficients, $w_m(n)$, based on the baseband radio signal with reduced spur interference e(n).

Example 39 is a radio transceiver (100) comprising the spur reduction circuit (10) of one of the examples 1 to 19 or the spur reduction apparatus of one of the examples 20 to 38.

Example 40 is the radio transceiver (100) of example 39 comprising radio frequency front-end circuits and a down-conversion circuit configured to convert a received radio signal into the baseband radio signal.

Example 41 is a mobile terminal (200) comprising the radio transceiver of one of the examples 39 or 40.

Example 42 is a method for reducing spur interference in a baseband radio signal, d(n), n indexing samples, the method comprising inputting (42) the baseband radio signal, d(n), and information on at least one spur frequency, $\omega(n)$;

adaptively filtering (44) the baseband radio signal, d(n), to obtain a baseband radio signal with reduced spur interference, e(n), based on at least one filter coefficient, w(n), and based on the information on the at least one spur frequency, $\omega(n)$;

updating (46) the at least one filter coefficient, w(n), based on the baseband radio signal with reduced spur interference e(n); and outputting (48) the baseband signal with reduced spur interference e(n), wherein the information on at least one spur frequency, $\omega(n)$, comprises digital samples of at least one continuous wave signal u(n) with the at least one spur frequency $\omega(n)$.

Example 43 is the method of example 42, wherein the adaptively filtering (44) comprises multiplying the digital samples of each continuous wave signal, u(n), with one filter coefficient, w(n), to obtain at least one correction signal, y(n).

Example 44 is the method of example 43, wherein the adaptively filtering (44) comprises combining the baseband radio signal, d(n), with the correction signal y(n), to obtain the baseband radio signal with reduced spur interference e(n).

Example 45 is the method of example 43, wherein the adaptively filtering (44) comprises combining a sign of the baseband radio signal, d(n), with a sign of the correction signal y(n), to obtain the baseband radio signal with reduced spur interference e(n).

Example 46 is the method of example 45, wherein the adaptively filtering (44) comprises determining the baseband radio signal with reduced spur interference e(n) based on an exclusive-or combination of the signs of the baseband radio signal, d(n), and the correction signal y(n).

Example 47 is the method of one of the examples 42 to 46, wherein the updating (46) comprises updating one filter coefficient, w(n), per continuous wave signal u(n), iteratively.

Example 48 is the method of example 47, wherein an updated filter coefficient, w(n+1), is based on a previous filter coefficient, w(n), and a relation between samples of the baseband radio signal, d(n), and the baseband radio signal with reduced spur interference e(n).

Example 48 is the method of one of the examples 47 or 48, wherein an updated filter coefficient, w(n+1), is based on a previous filter coefficient, w(n), and a relation between samples of the baseband radio signal, d(n), and a sign of the baseband radio signal with reduced spur interference e(n).

Example 50 is the method of one of the examples 48 or 49, wherein the updated filter coefficient, w(n+1), further is based on a weighting factor, µ, weighting
 a combination of the baseband radio signal, d(n), and the baseband radio signal with reduced spur interference e(n), or
 a combination of the baseband radio signal, d(n), and the sign of the baseband radio signal with reduced spur interference e(n).

Example 51 is the method of example 50, wherein the updating (46) comprises updating the weighting factor, µ.

Example 52 is the method of example 51, wherein the updating (46) comprises decreasing the weighting factor, µ, with an increasing number of filtered samples.

Example 53 is the method of example 52, wherein the updating (46) comprises obtaining the weighting factor, µ, by initiating the weighting factor, µ, with an initial value for an initial count of samples, by lowering the initial value for an increased subsequent count of samples, and repeating lowering the weighting factor, µ, and increasing the count of samples until a predetermined end value or sample count is reached.

Example 54 is the method of example 53, wherein the updating (46) comprises obtaining the weighting factor, µ, by initiating the weighting factor, µ, with the initial value for the initial count of samples, by lowering the initial value by 50% for a doubled subsequent count of samples, and repeating lowering by 50% the weighting factor, µ, and doubling the count of samples until a predetermined end value or sample count is reached.

Example 55 is the method of one of the examples 53 or 54, wherein the updating (46) comprises adapting the initial value or the predetermined end value or both, based on a relation of two or more elements of the group of a spur level, a carrier level and a noise level of the baseband radio signal.

Example 56 is the method of example 55, wherein the updating (46) comprises selecting a first lower initial value for a first lower spur-to-carrier-and-noise-level and selecting a second higher initial value for a second higher spur-to-carrier-and-noise-level.

Example 57 is the method of one of the examples 50 to 56, wherein the updating (46) comprises resetting the weighting factor, µ, to the initial value, in case changes of the baseband radio signal with reduced spur interference e(n) remain below a predetermined threshold for a predetermined time, or in case a sign of the baseband radio signal with reduced spur interference e(n) remains constant for the predetermined time.

Example 58 is the method of example 57, wherein the updating (46) comprises obtaining the weighting factor, µ, from a look-up table, wherein the look-up table assigns weighting factors, µ, to a count of filtered samples.

Example 59 is the method of one of the examples 42 to 58, wherein the inputting (42) the baseband radio signal, d(n), and the information on at least one spur frequency, comprises obtaining information on a plurality of spur frequencies, $\omega_m(n)$, m indexing the spur frequencies,
 wherein the adaptively filtering (44) comprises filtering the baseband radio signal, d(n), based on a plurality of filter coefficients, $w_m(n)$, and based on the information on the plurality of spur frequencies, $\omega_m(n)$, and
 wherein the updating (46) comprises adapting the plurality of filter coefficients, $w_m(n)$, based on the baseband radio signal with reduced spur interference e(n).

Example 60 is a computer program having a program code for performing the method of at least one of the examples 42 to 59, when the computer program is executed on a computer, a processor, or a programmable hardware component.

Example 61 is a machine readable storage including machine readable instructions, when executed, to implement a method or realize an apparatus as exemplified in any example described herein.

Example 62 is a machine readable medium including code, when executed, to cause a machine to perform the method of any one of examples 42 to 59.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means" etc., may be implemented in the form of dedicated hardware, such as "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A spur reduction circuit configured to reduce spur interference in a baseband radio signal, $d(n)$, n indexing samples, the spur reduction circuit comprising
    at least one input for the baseband radio signal, $d(n)$, and information on at least one spur frequency, $\omega(n)$;
    an adaptive filter configured to filter the baseband radio signal, $d(n)$, to obtain a baseband radio signal with reduced spur interference, $e(n)$, the adaptive filter being further configured to filter the baseband radio signal, $d(n)$, based on at least one filter coefficient, $w(n)$, and based on the information on the at least one spur frequency, $\omega(n)$;
    an update module configured to adapt the at least one filter coefficient, $w(n)$, based on the baseband radio signal with reduced spur interference $e(n)$; and
    at least one output for the baseband signal with reduced spur interference $e(n)$,
    wherein the information on at least one spur frequency, $\omega(n)$, comprises digital samples of at least one continuous wave signal $u(n)$ with the at least one spur frequency $\omega(n)$.

2. The spur reduction circuit of claim 1, wherein the adaptive filter is configured to multiply the digital samples of each continuous wave signal, $u(n)$, with one filter coefficient, $w(n)$, to obtain at least one correction signal, $y(n)$.

3. The spur reduction circuit of claim 2, wherein the adaptive filter comprises at least one combiner to combine the baseband radio signal, $d(n)$, with the correction signal $y(n)$, to obtain the baseband radio signal with reduced spur interference $e(n)$.

4. The spur reduction circuit of claim 3, wherein the combiner is further configured to combine a sign of the baseband radio signal, $d(n)$, with a sign of the correction signal $y(n)$, to obtain the baseband radio signal with reduced spur interference $e(n)$.

5. The spur reduction circuit of claim 4, wherein the adaptive filter is configured to determine the baseband radio signal with reduced spur interference $e(n)$ based on an exclusive-or combination of the signs of the baseband radio signal, $d(n)$, and the correction signal $y(n)$.

6. The spur reduction circuit of claim 1, wherein the update module is configured to update one filter coefficient, $w(n)$, per continuous wave signal $u(n)$, iteratively.

7. The spur reduction circuit of claim 6, wherein an updated filter coefficient, $w(n+1)$, is based on a previous filter coefficient, $w(n)$, and a relation between samples of the baseband radio signal, $d(n)$, and the baseband radio signal with reduced spur interference $e(n)$.

8. The spur reduction circuit of claim 7, wherein an updated filter coefficient, $w(n+1)$, is based on a previous filter coefficient, $w(n)$, and a relation between samples of the baseband radio signal, $d(n)$, and a sign of the baseband radio signal with reduced spur interference $e(n)$.

9. The spur reduction circuit of claim 7, wherein the updated filter coefficient, $w(n+1)$, further is based on a weighting factor, $\mu$, weighting
    a combination of the baseband radio signal, $d(n)$, and the baseband radio signal with reduced spur interference $e(n)$, or
    a combination of the baseband radio signal, $d(n)$, and the sign of the baseband radio signal with reduced spur interference $e(n)$.

10. The spur reduction circuit of claim 9, wherein the update module is configured to update the weighting factor, $\mu$.

11. The spur reduction circuit of claim 10, wherein the update module is configured to decrease the weighting factor, $\mu$, with an increasing number of filtered samples.

12. The spur reduction circuit of claim 10, wherein the update module is configured to obtain the weighting factor, $\mu$, by initiating the weighting factor, $\mu$, with an initial value for an initial count of samples, by lowering the initial value for an increased subsequent count of samples, and repeating lowering the weighting factor, $\mu$, and increasing the count of samples until a predetermined end value or sample count is reached.

13. The spur reduction circuit of claim 12, wherein the update module is configured to obtain the weighting factor, µ, by initiating the weighting factor, µ, with the initial value for the initial count of samples, by lowering the initial value by 50% for a doubled subsequent count of samples, and repeating lowering by 50% the weighting factor, µ, and doubling the count of samples until a predetermined end value or sample count is reached.

14. The spur reduction circuit of claim 13, wherein the update module is configured to adapt the initial value or the predetermined end value or both, based on a relation of two or more elements of the group of a spur level, a carrier level and a noise level of the baseband radio signal.

15. The spur reduction circuit of claim 14, wherein the update module is configured to select a first lower initial value for a first lower spur-to-carrier-and-noise-level and wherein the update module is configured to select a second higher initial value for a second higher spur-to-carrier-and-noise-level.

16. The spur reduction circuit of claim 15, wherein the update module is configured to reset the weighting factor, µ, to the initial value, in case changes of the baseband radio signal with reduced spur interference e(n) remain below a predetermined threshold for a predetermined time, or in case a sign of the baseband radio signal with reduced spur interference e(n) remains constant for the predetermined time.

17. The spur reduction circuit of claim 10, wherein the update module is configured to obtain the weighting factor, µ, from a look-up table, wherein the look-up table assigns weighting factors, µ, to a count of filtered samples.

18. The spur reduction circuit of claim 1, wherein the at least one input for the baseband radio signal, d(n), and the information on at least one spur frequency, is configured to obtain information on a plurality of spur frequencies, $\omega_m(n)$, m indexing the spur frequencies,
wherein the adaptive filter is further configured to filter the baseband radio signal, d(n), based on a plurality of filter coefficients, $w_m(n)$, and based on the information on the plurality of spur frequencies, $\omega_m(n)$, and
wherein the update module is configured to adapt the plurality of filter coefficients, $w_m(n)$, based on the baseband radio signal with reduced spur interference e(n).

19. A radio transceiver comprising the spur reduction circuit of claim 1.

20. A method for reducing spur interference in a baseband radio signal, d(n), n indexing samples, the method comprising
inputting the baseband radio signal, d(n), and information on at least one spur frequency, ω(n);
adaptively filtering the baseband radio signal, d(n), to obtain a baseband radio signal with reduced spur interference, e(n), based on at least one filter coefficient, w(n), and based on the information on the at least one spur frequency, ω(n);
updating the at least one filter coefficient, w(n), based on the baseband radio signal with reduced spur interference e(n); and
outputting the baseband signal with reduced spur interference e(n),
wherein the information on at least one spur frequency, ω(n), comprises digital samples of at least one continuous wave signal u(n) with the at least one spur frequency ω(n).

21. The method of claim 20, wherein the adaptively filtering comprises multiplying the digital samples of each continuous wave signal, u(n), with one filter coefficient, w(n), to obtain at least one correction signal, y(n).

22. The method of claim 21, wherein the adaptively filtering comprises combining the baseband radio signal, d(n), with the correction signal y(n), to obtain the baseband radio signal with reduced spur interference e(n).

23. A non-transitory machine-readable medium including code, when executed, to cause a machine to perform a method for reducing spur interference in a baseband radio signal, d(n), n indexing samples, the method comprising
inputting the baseband radio signal, d(n), and information on at least one spur frequency, ω(n);
adaptively filtering the baseband radio signal, d(n), to obtain a baseband radio signal with reduced spur interference, e(n), based on at least one filter coefficient, w(n), and based on the information on the at least one spur frequency, ω(n);
updating the at least one filter coefficient, w(n), based on the baseband radio signal with reduced spur interference e(n); and
outputting the baseband signal with reduced spur interference e(n),
wherein the information on at least one spur frequency, ω(n), comprises digital samples of at least one continuous wave signal u(n) with the at least one spur frequency ω(n).

24. The non-transitory machine-readable medium of claim 23, wherein the adaptively filtering comprises multiplying the digital samples of each continuous wave signal, u(n), with one filter coefficient, w(n), to obtain at least one correction signal, y(n).

* * * * *